United States Patent [19]

Shorter

[11] Patent Number: 6,070,169
[45] Date of Patent: May 30, 2000

[54] METHOD AND SYSTEM FOR THE DETERMINATION OF A PARTICULAR DATA OBJECT UTILIZING ATTRIBUTES ASSOCIATED WITH THE OBJECT

[75] Inventor: David Uel Shorter, Lewisville, Tex.

[73] Assignee: International Business Machines Corporation, Armonk, N.Y.

[21] Appl. No.: 09/022,910

[22] Filed: Feb. 12, 1998

[51] Int. Cl.[7] .................................................. G06F 17/30
[52] U.S. Cl. ................................ 707/103; 707/3; 707/10
[58] Field of Search .................................. 707/103, 3, 10

[56] References Cited

U.S. PATENT DOCUMENTS

| | | |
|---|---|---|
| 4,723,209 | 2/1988 | Hernandez et al. . |
| 5,117,351 | 5/1992 | Miller . |
| 5,241,624 | 8/1993 | Torres . |
| 5,257,349 | 10/1993 | Alexander . |
| 5,261,098 | 11/1993 | Katin et al. . |
| 5,291,583 | 3/1994 | Bapat . |
| 5,291,593 | 3/1994 | Abraham et al. . |
| 5,410,702 | 4/1995 | Abraham et al. . |
| 5,499,365 | 3/1996 | Anderson et al. . |
| 5,581,758 | 12/1996 | Burnett et al. . |
| 5,615,362 | 3/1997 | Jensen et al. . |
| 5,802,524 | 9/1998 | Flowers et al. .......................... 707/103 |

*Primary Examiner*—Thomas G. Black
*Assistant Examiner*—Frantz Coby
*Attorney, Agent, or Firm*—Richard A. Tomilin; Felsman, Bradley, Vaden, Gunter & Dillon, LLP

[57] ABSTRACT

A method and system are disclosed for the determination of a particular one of a plurality of data objects stored in the data processing system utilizing attributes associated with the object. Data is associated with a first plurality of a plurality of attributes associated with each data object. In response to an establishment of each data object, an object attribute record is established which includes the first plurality of the plurality of attributes. Search data is specified for a second plurality of the first plurality of attributes. Each object attribute record is searched for the search data. In response to a location of at least a portion of the specified search data in one of the object attribute records, the data object associated with that object attribute record is determined.

16 Claims, 7 Drawing Sheets

| Attribute Name 52 | Match Weight 54 | Non-Match Weight 56 | Post Rule Weight 58 | Rule Name 60 |
|---|---|---|---|---|
| Last Name | 50 _62_ | 100 _64_ | 20 _66_ | Uppercase _68_ |
| First Name | 10 | 10 | 5 | Uppercase |
| SSN | 60 | 100 | 30 | Transpose |
| DOB | 40 | 40 | 0 | None |
| Gender | 0 | 100 | 0 | None |

METHOD AND SYSTEM FOR THE DETERMINATION OF A PARTICULAR DATA OBJECT UTILIZING ATTRIBUTES ASSOCIATED WITH THE OBJECT

BACKGROUND OF THE INVENTION

1. Technical Field

The present invention relates to data processing systems and, in particular, to data processing systems including a database having a plurality of data objects. Still more particularly, the present invention relates to the determination of data object utilizing attributes associated with the object.

2. Description of the Related Art

Data objects are typically stored in a computer system in a database. When an object is stored in a computer system, it is associated with an object identification which is unique within a defined scope in the computer system. The object ID is used internally in the computer system as a "key" to identify a particular object so that the object may be accessed, such as by retrieval of the object. The object ID may or may not be known outside of the computer system. The object ID may be associated with an object internally by the computer system or externally by a user.

An object may have multiple associated attributes. Attributes could include, for example, a name, such as a person's name, date, and/or number. An attribute value, or attribute data, is defined for each attribute. Therefore, the name attribute for a particular object may include a particular person's name.

When a user of the computer system wishes to locate a particular object, the user may not know the object's unique ID. The user may search for an object by providing search data for a particular attribute. Each object within the database must be searched to determine if object's attribute value, or attribute data, is the same as the specified search attribute data. Only when the search data and attribute data are exactly the same will the object be retrieved. Often times, however, the search data will not be unique causing several objects to be located in response to a search for a particular object.

Therefore a need exists for a method and system for determining a unique identification of an object utilizing attributes associated with the object.

SUMMARY OF THE INVENTION

It is therefore one object of the present invention to provide an improved data processing system.

It is another object of the present invention to provide an improved data processing system having a database including a plurality of stored data objects.

It is yet another object of the present invention to provide a method and system for the determination of a unique identification of an object utilizing attributes associated with the object.

The foregoing objects are achieved as is now described. A method and system are disclosed for the determination of a particular one of a plurality of data objects stored in the data processing system utilizing attributes associated with the object. Data is associated with a first plurality of a plurality of attributes associated with each data object. In response to an establishment of each data object, an object attribute record is established which includes the first plurality of the plurality of attributes. Search data is specified for a second plurality of the first plurality of attributes. Each object attribute record is searched for the search data. In response to a location of at least a portion of the specified search data in one of the object attribute records, the data object associated with that object attribute record is determined.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–6B of the drawings, like numerals being used for like and corresponding parts of the accompanying drawings.

Figure 1:
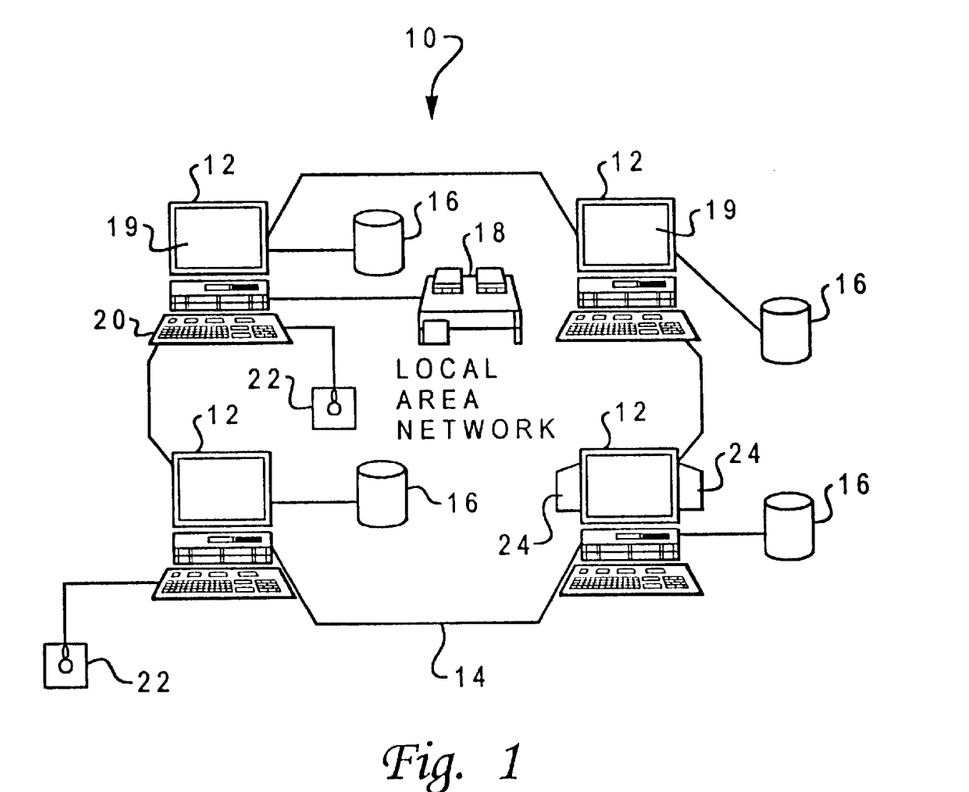
FIG. 1 depicts a pictorial representation of a data processing system embodying the present invention.

With reference now to the figures and in particular with reference to FIG. 1, there is depicted a pictorial representation of a data processing system 10 which may be utilized to implement the method and system of the present invention. In a preferred embodiment, data processing system 10 may include a plurality of computers 12 which may be connected together in a local area network 14. Of course, those skilled in the art will appreciate that a plurality of intelligent workstations coupled to a host processor may be utilized to implement such network.

As is common in such data processing systems, each individual computer may be coupled to a storage device 16 and/or a printer/output device 18. One or more such storage devices may be utilized to store the various data objects or multimedia files which may be periodically accessed, processed, and presented within data processing system 10 in accordance with the method and system of the present invention. In a manner well known in the prior art, each such data processing document or multimedia file may be stored within a storage device which may be associated with a resource manager or library service, which is responsible for maintaining and updating all resource objects associated therewith.

Each computer 12 may be implemented utilizing any suitably configured personal computer, mini computer, mainframe computer, or a computer running in a network of other computers. Computer 12 has associated therewith a computer display 19, keyboard 20, input pointing device 22, and speakers 24. Those skilled in the art will appreciate that input pointing device 22 may be implemented utilizing a pointing stick, a mouse, a track ball, or a pen.

The present invention is a method and system whereby an object attribute record is created in response to a creation of a data object, and the storage of the data object in a database.

Figure 2:
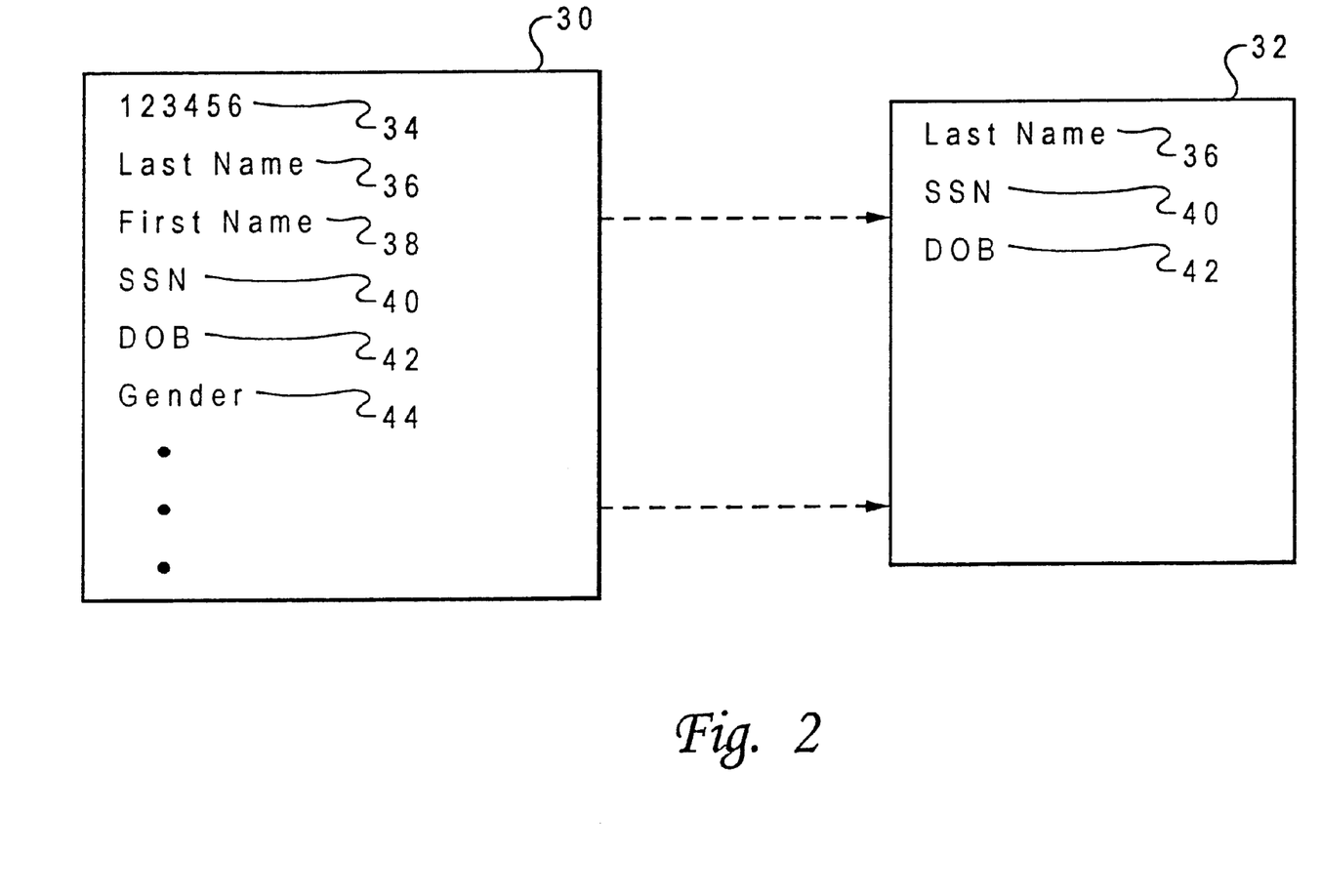
FIG. 2 illustrates a pictorial representation of a data object and its associated object attribute record stored in the data processing system of FIG. 1 in accordance with the method and system of the present invention.

FIG. 2 illustrates a pictorial representation of a data object 30 and its associated object attribute record 32 stored in the data processing system of FIG. 1 in accordance with the method and system of the present invention.

Data object 30 includes a unique identification 34, as well as attributes 36–44. For example, a data object may be a file for a particular person within a database. The object may include the person's last name, first name, social security number (SSN), date of birth (DOB), gender, and other information such as account information, payment history, or medical history.

Each data object stored in the database will be associated with a unique identifier. Typically, in order to retrieve a particular object, the unique identification is utilized. In this manner, only one data object will be returned. However, the unique object identifier for the desired data object is not always known by the user of the system. In this case, data must be specified for various attributes, such as the last name and social security number of the person for whom the data object is desired. A search may then be performed utilizing the data specified for these attributes.

In order to perform a search utilizing only data specified for particular attributes, an object attribute record 32 is created and stored for each data object. Therefore, each object stored within the database will have an associated object attribute record. Object attribute record 32 may include all attributes included within its associated object 30, or it may include only a subset of the attributes. For example, object attribute record 32 includes only attributes 36, 40, and 42.

When a search is to be performed utilizing the object attribute record, a user must specify data for a minimum combination of attributes included within the object attribute record. For example, the combination of a last name and social security number may be one valid combination providing sufficient information to perform a search. Another example may be the combination of a social security number and a date of birth. By specifying data for either of these minimum combinations of data, or by specifying data for all attributes, a search may then be performed.

A search is conducted of each object attribute record utilizing the data specified for the specified attributes. For each object attribute record, it is determined whether each attribute matches the data specified for that attribute. For example, a user may wish to search for the last name SMITH having a social security number of 000-00-0000 and a date of birth of Jan. 1, 1998. For each object attribute record, the last name of SMITH is compared to the stored last name. For each object attribute record, the social security number of 000-00-0000 is compared to the stored social security number. And, for each object attribute record, the date of birth of Jan. 1, 1998 is compared to the stored date of birth.

Figure 3:
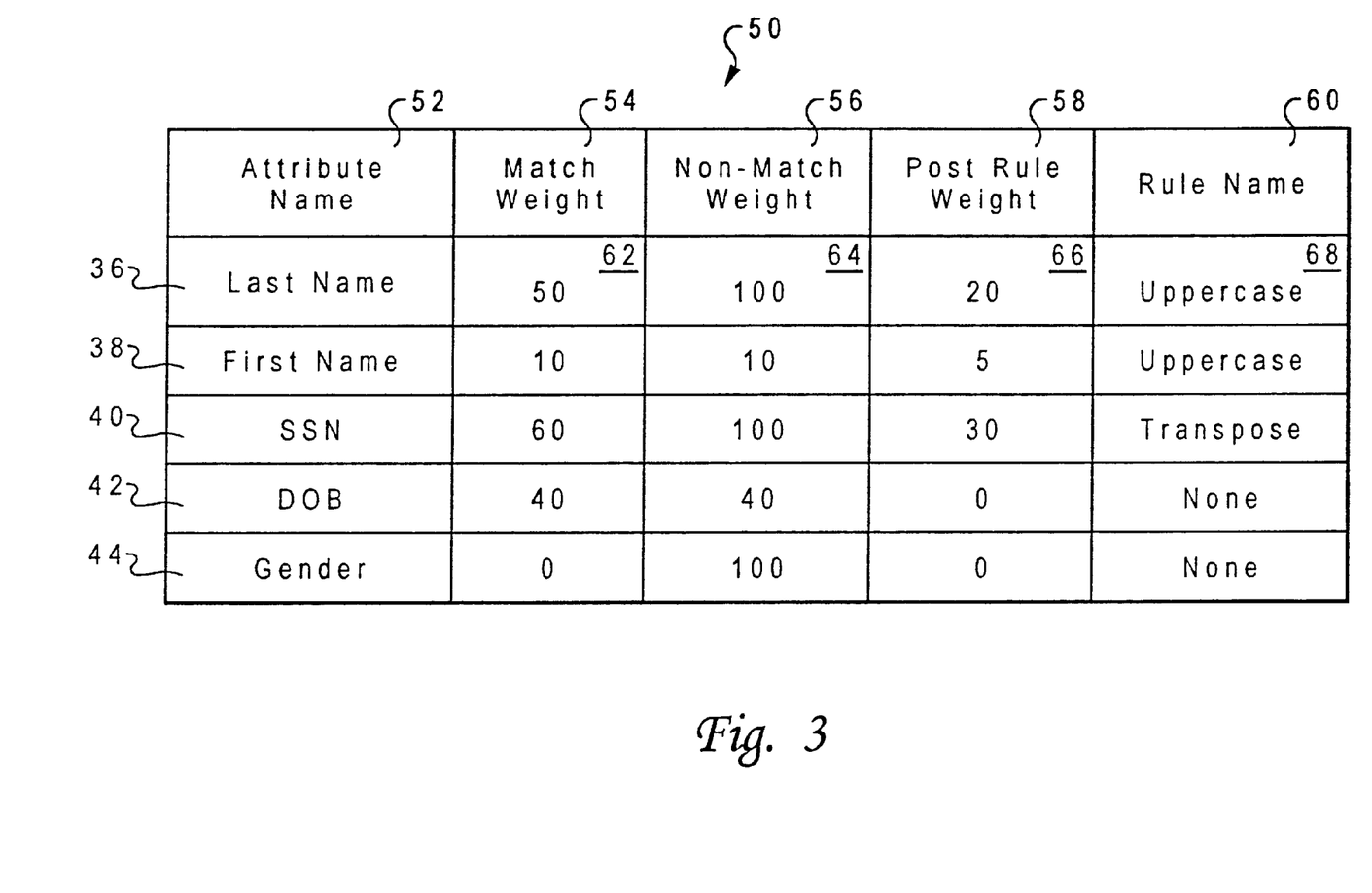
FIG. 3 illustrates a pictorial representation of an attribute table utilized during a search of the data processing system of FIG. 1 for a particular data object in accordance with the method and system of the present invention.

FIG. 3 illustrates a pictorial representation of an attribute table 50 utilized during a search of the data processing system of FIG. 1 for a particular data object in accordance with the method and system of the present invention.

Attribute table 50 is utilized during a search to determine whether the correct data object has been located. Attribute table 50 includes an attribute name 52, match weight value 54, non-match weight value 56, post rule weight value 58, and an optional rule name 60. Attribute table 50 includes all attributes which might be utilized during a search. Prior to performing a search, weighting values are associated with each attribute.

Match weight value 54 is a quantitative valuation of the worth of the attribute associated with this value if the data stored for this attribute matches the data supplied for the search. Non-match weight value 56 is a quantitative valuation of the worth of the attribute associated with this value if the data stored for this attribute did not match the data supplied for the search. Post rule weight value 58 is a quantitative valuation of the worth of the attribute associated with this value if an exact match was not originally found but was subsequently found after executing the rule specified by rule name 60. Rule name 60 may optionally be supplied.

From the example above, a user may wish to search for the last name SMITH having a social security number of 000-00-0000 and a date of birth of Jan. 1, 1998. For each object attribute record, the last name, social security number, and date of birth is compared to the stored date of birth. Instead of search each object attribute record, a subset of all object attribute records may be searched. If a match is found in a first object attribute record having the same last name, a match value of 50 is calculated utilizing the value stored in field 62. If no match is found, the rule specified in field 68 may be executed. In this example, the "uppercase" rule will be executed. If a match is then found for the first object attribute record after the execution of the "uppercase" rule, the value stored in field 66, 20, is added to the calculated match value. If a match is not found in the first object attribute record for the last name attribute, and the execution of the rule did not result in finding a match, the value stored in field 64, 100, is subtracted from the calculated match value. Therefore, for the first object attribute record, a calculated match value is calculated utilizing the last name attribute.

This process is repeated for each attribute for each object attribute record. In this manner, a calculated match value is determined utilizing the appropriate weighting values for each specified attribute for the search.

A total match value is specified. This total match value is utilized to determine which of the searched object attribute records match the desired object. In the example of FIG. 3, a total match value of 100 is specified. If the total calculated match value either equals or exceeds the specified total match value for a particular object attribute record, the object associated with that object attribute record is returned as a match. If the total calculated match value is less than the specified total match value for a particular object attribute record, the object associated with that object attribute record is not returned as a match.

Figure 4:
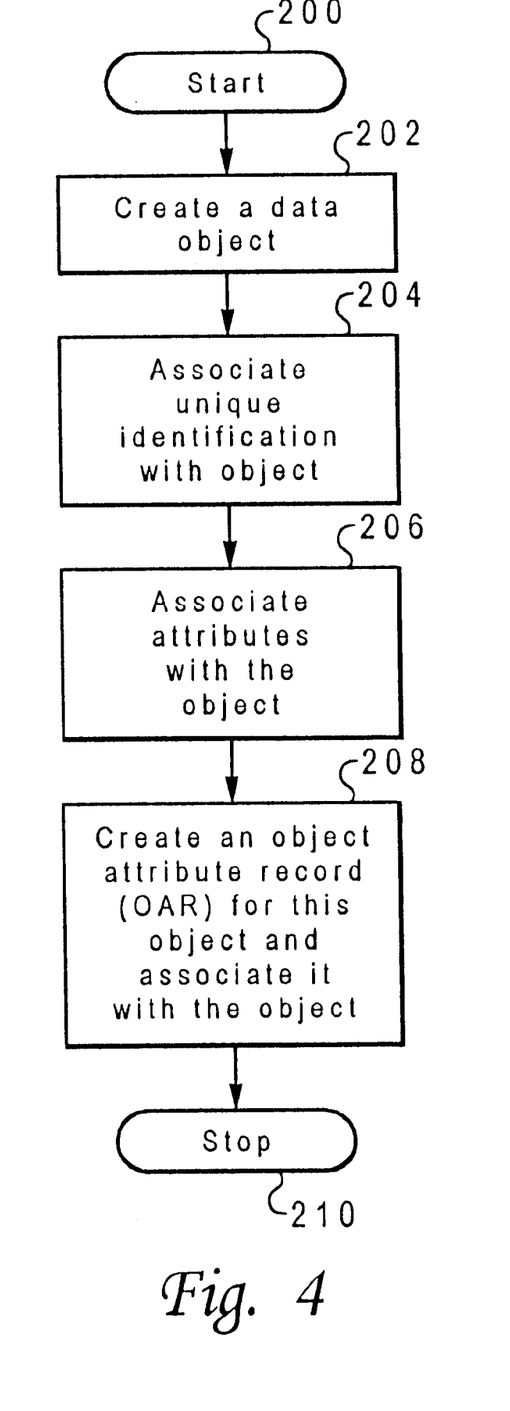
FIG. 4 is a high-level flow chart depicting the creation of a data object and its associated object attribute record in accordance with the method and system of the present invention.

FIG. 4 is a high-level flow chart depicting the creation of a data object and its associated object attribute record in accordance with the method and system of the present invention. The process starts as depicted at block 200 and thereafter passes to block 202 which illustrates the creation of a data object and its storage in data processing system 10. Block 204, then, depicts the association of a unique identification with the object. The unique identification may be any combination of alphanumeric characters selected to uniquely identify this object.

Next, block 206 illustrates the association of attributes with this object. For example, the attributes may include a person's last name, date of birth (DOB), social security number (SSN), first name, gender, and any other identifying information. The process then passes to block 208 which depicts the creation of an object attribute record. A different object attribute record is associated with each object stored in the database. The object attribute record may contain all of the attributes associated with its associated data object, or it may contain only a subset of those attributes. Each object attribute record is associated with its particular data object and is then also stored in the database. The process terminates as illustrated at block 210.

Figure 5:
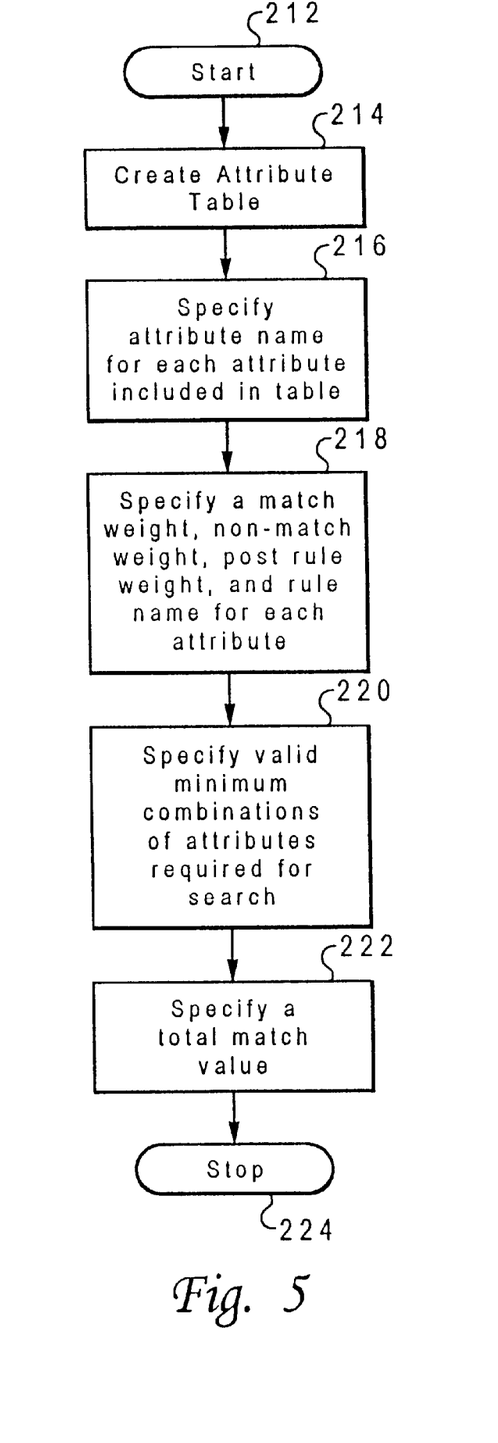
FIG. 5 is a high-level flow chart illustrating the creation of an attribute table, and the storage of attribute names and their associated match, non-match, and post rule match weight values, and rule names in accordance with the method and system of the present invention.

FIG. 5 is a high-level flow chart illustrating the creation of an attribute table, and the storage of attribute names and their associated match, non-match, and post rule match weight values, and rule names in accordance with the method and system of the present invention. The process starts as depicted at block 212 and then passes to block 214 which illustrates the creation of an attribute table. Next, block 216 depicts the specification of an attribute name for each attribute to be included in the attribute table. Thereafter, block 218 illustrates the specification of a match weight, non-match weight, and post rule weight values, and a rule name for each attribute included in the table. The process then passes to block 220 which depicts the specification of a valid minimum combination of attributes required to perform a search. More than one combination of attributes may be specified. For a search to be performed, a user must enter at least enough information to satisfy one of the combinations. Next, block 222 illustrates the specification of a total match value. This value is utilized to determine whether an object attribute record will be considered to be a match with the requested object. The process then terminates as illustrated at block 224.

Figure 6A:
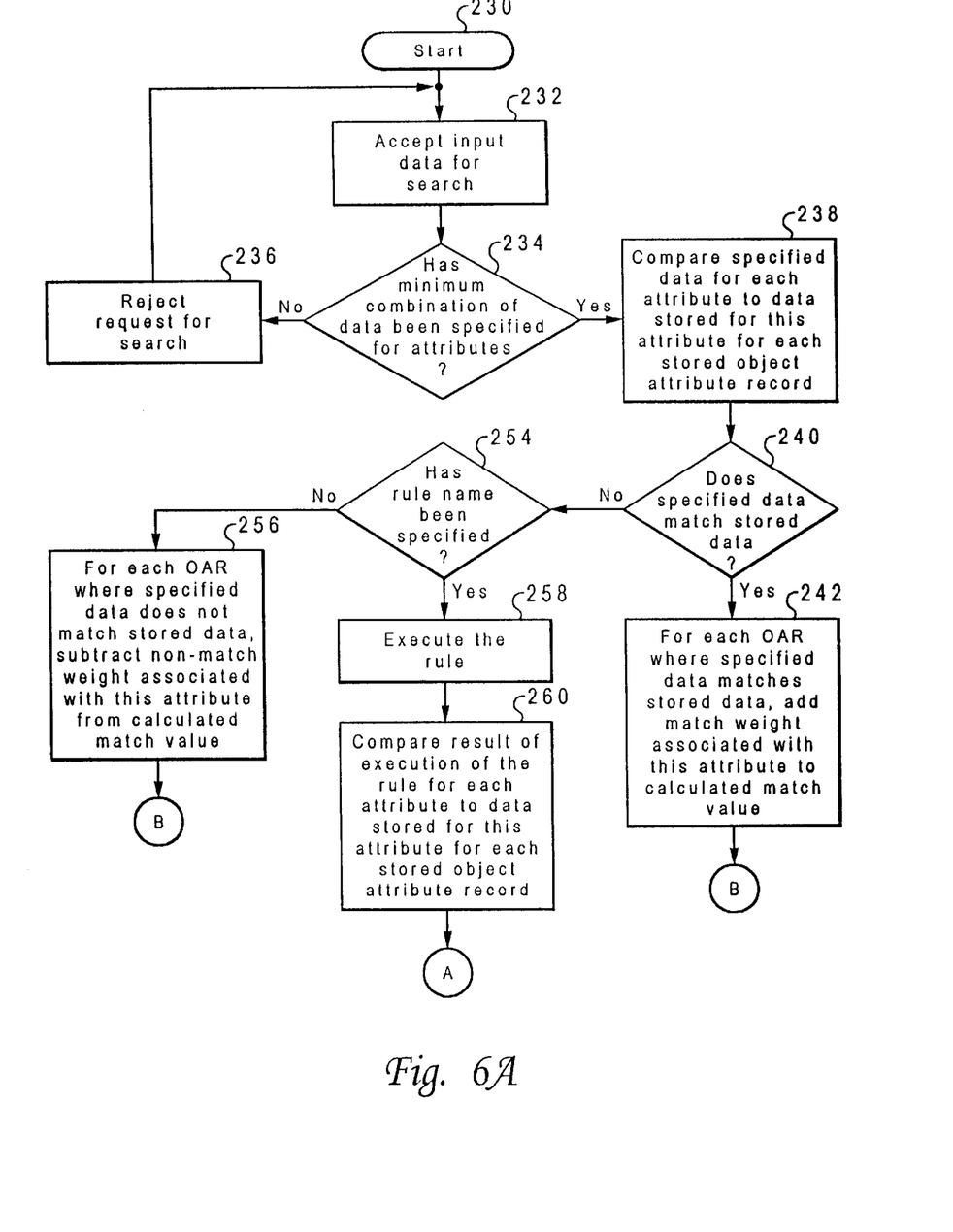
FIGS. 6A and 6B together are a high-level flow chart depicting searching of the data processing system of FIG. 1 for a particular object utilizing an attribute table and the stored object attribute records in accordance with the method and system of the present invention.
Figure 6B:
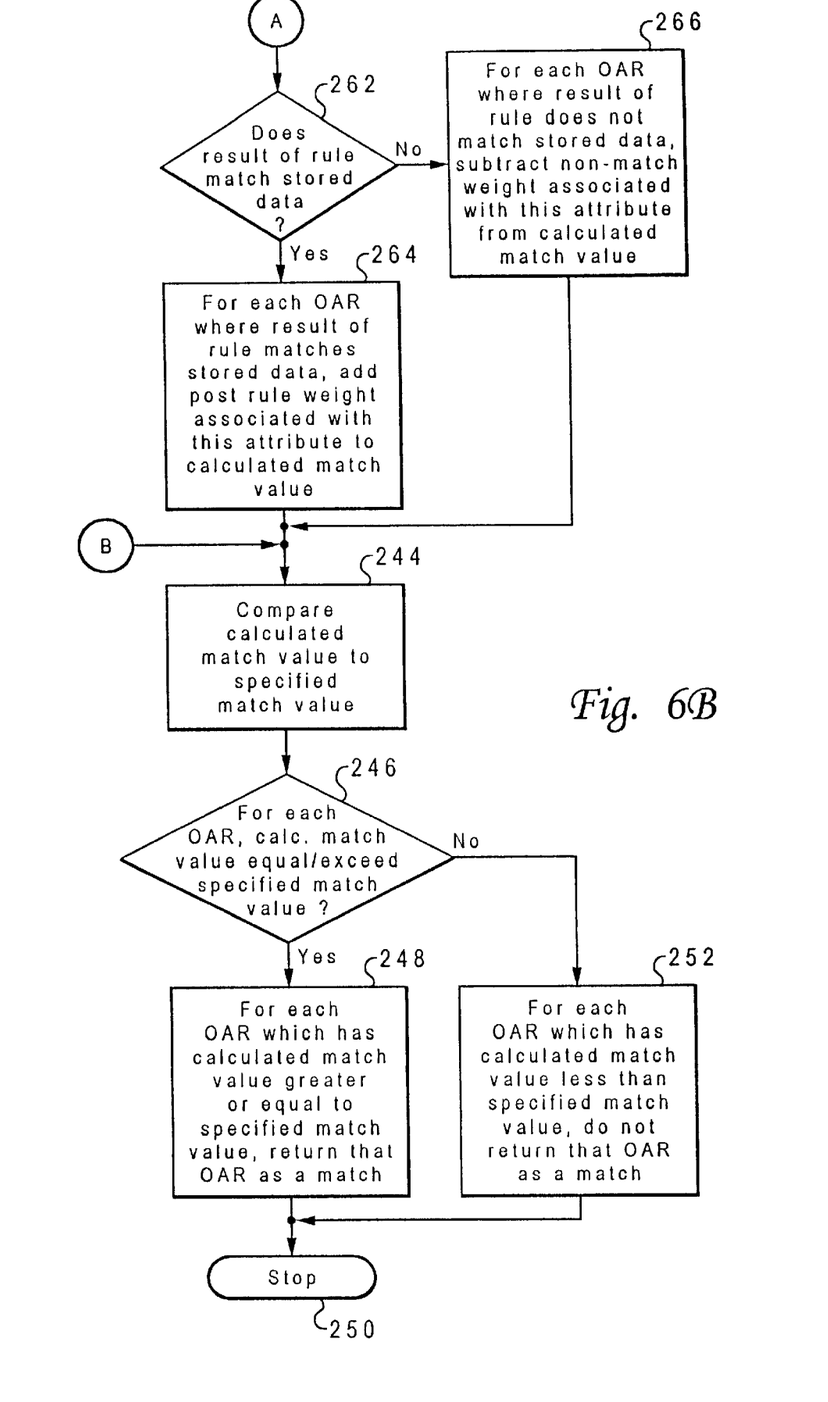

FIGS. 6A and 6B together are a high-level flow chart depicting searching of the data processing system of FIG. 1 for a particular object utilizing an attribute table and the stored object attribute records in accordance with the method and system of the present invention. The process starts as depicted at block 230 and thereafter passes to block 232 which illustrates the acceptance of input data to be utilized to perform a search. The process than passes to block 234 which depicts a determination of whether or not a minimum combination of data has been specified in order to perform a search. This determination is made by comparing the data specified at block 232 to each of the combinations specified in FIG. 5, block 220. If a determination is made that a minimum combination of data has not been specified, the process passes to block 230 which depicts the rejection of the specified search request. The process then passes back to block 232.

Referring again to block 234, if a determination is made that a minimum combination of data has been specified, the process passes to block 238 which illustrates a comparison of the specified data for each attribute to the data stored for this attribute for each stored attribute object. The process then passes to block 240 which illustrates a determination of whether or not the specified data match the stored data for each attribute specified for the search. If a determination is made that the specified data matches the stored data for an attribute, the process passes to block 242 which depicts adding the match weight associated with the matching attribute to the calculated match value for each object attribute record which contains a matching attribute.

The process then passes to block 244 as depicted through connector B. Block 244 illustrates a comparison of the calculated match value to the match value specified in FIG. 5, block 222. Next, block 246 depicts a determination of whether or not for each object attribute record the calculated match value either meets or exceeds the specified match value. If a determination is made that the calculated match value either meets or exceeds the specified match value for a particular object attribute record, the process passes to block 248 which illustrates for each object attribute record where the calculated match value meets or exceeds the specified match value, returning that object attribute record as a match. The process then terminates as depicted at block 250.

Referring again to block 246, if a determination is made that the calculated match value is less than the specified match value for a particular object attribute record, the process passes to block 252 which illustrates for each object attribute record where the calculated match value is less than the specified match value, not returning that object attribute record as a match. The process then terminates as depicted at block 250.

Referring again to block 240, if a determination is made that the specified data does not match the stored data for this attribute, the process passes to block 254 which depicts a determination of whether a rule has been specified for the attribute including data which does not match the specified data for the attribute. If a determination is made that a rule has not been specified, the process passes to block 256 which illustrates subtracting the non-match weight associated with the attribute which does not match from the calculated match value for each object attribute record which contains a non-matching attribute. The process then passes to block 244 as depicted through connector B.

Referring again to block 254, if a determination is made that a rule has been specified for the attribute including data which does not match the specified data for the attribute, the process passes to block 258 which illustrates the execution of the rule. After the rule has been executed, the process passes to block 260 which depicts a comparison of the result of the execution of the rule for each attribute to the data stored for that attribute for each stored object attribute record. The process then passes to block 262 as illustrated through connector A.

Block 262 depicts a determination of whether or not the result of the rule matches the specified data for this attribute. If a determination is made that the result of the rule does match the specified data for this attribute, the process passes to block 264 which illustrates for each object attribute record where the result of the rule matches the stored data for that attribute, adding the post rule weight associated with that attribute to the calculated match value. The process then passes to block 244.

Referring again to block 262, if a determination is made that the result of the rule does not match the specified data for this attribute, the process passes to block 266 which illustrates for each object attribute record where the result of the rule does not match the stored data for that attribute, subtracting the non-match weight associated with that attribute from the calculated match value. The process then passes to block 244.

While a preferred embodiment has been particularly shown and described, it will be understood by those skilled in the art that various changes in form and detail may be made therein without departing from the spirit and scope of the present invention.

What is claimed is:

1. A method in a data processing system for determining a particular one of a plurality of data objects stored in said data processing system, said method comprising the steps of:

establishing a plurality of data objects, each of said plurality of data objects having a plurality of attributes;

associating data with a first plurality of said plurality of attributes for each of said plurality of data objects;

in response to said establishment of said each of said plurality of data objects, establishing an object attribute record having said first plurality of said plurality of attributes, wherein each of said object attribute records is associated with only one of said plurality of data objects;

specifying search data for each of a second plurality of said first plurality of said plurality of attributes;

searching each of said object attribute records for said specified search data;

for each of said object attribute records, comparing said specified search data associated with each of said first plurality of said plurality of attributes with said associated data; and in response to a location of at least a portion of said specified search data in one of said each of said object attribute records, determining said one of said plurality of data objects associated with said one of said each of said object attribute records; by specifying a match weight value utilized when specified search data matches data associated with a particular one of said first plurality of said plurality of attributes; and specifying a total match value, wherein said total match value must be met or exceeded said one of said plurality of data objects to be determined to be associated with said object attribute record including said particular one of said first plurality of said plurality of attributes.

2. The method according to claim 1 further including the steps of:

for each of said object attribute records, establishing an object attribute record total match value;

for each of said first plurality of said plurality of attributes for each of said object attribute records where said specified search data matched said associated data, adding said match weight value to said object attribute record total match value.

3. The method according to claim 2, further comprising the steps of:

specifying a non-match weight value utilized when specified search data does not match data associated with a particular one of said first plurality of said plurality of attributes; and for each of said first plurality of said plurality of attributes for each of said object attribute records where said specified search data does not match said associated data, subtracting said non-match weight value from said object attribute record total match value.

4. The method according to claim 3, further comprising the steps of:

for each of said object attribute records, determining whether said object attribute record total match value meets or exceeds said total match value; and in response to said object attribute record total match value meeting or exceeding said total match value, determining said data object associated with said object attribute record having an object attribute record total match value which meets or exceeds said total match value.

5. The method according to claim 1, further comprising the steps of:

specifying a plurality of valid combinations of said first plurality of said plurality of attributes; and determining whether said second plurality of said first plurality of said plurality of attributes is one of said plurality of valid combinations.

6. The method according to claim 5, wherein said step of searching each of said object attribute records for said specified search data is performed only in response to a determination that said second plurality of said first plurality of said plurality of attributes is one of said plurality of valid combinations.

7. The method according to claim 6, wherein said step of establishing a plurality of data objects having a plurality of attributes further includes the step of establishing a plurality of data objects having a social security number as an attribute.

8. The method according to claim 7, wherein said step of establishing a plurality of data objects having a plurality of attributes further includes the step of establishing a plurality of data objects having an individual's name as an attribute.

9. A data processing system for determining a particular one of a plurality of data objects stored in said data processing system, comprising:

means for establishing a plurality of data objects, each of said plurality of data objects having a plurality of attributes;

means for associating data with a first plurality of said plurality of attributes for each of said plurality of data objects;

means responsive to said establishment of said each of said plurality of data objects, for establishing an object attribute record having said first plurality of said plurality of attributes, wherein each of said object attribute records is associated with only one of said plurality of data objects;

means for specifying search data for each of a second plurality of said first plurality of said plurality of attributes;

means for searching each of said object attribute records for said specified search data;

means for each of said object attribute records, for comparing said specified search data associated with each of said first plurality of said plurality of attributes with said associated data;

means responsive to a location of at least a portion of said specified search data in one of said each of said object attribute records, for determining said one of said plurality of data objects associated with said one of said each of said object attribute records;

means for specifying a match weight value utilized when specified search data matches data associated with a particular one of said first plurality of said plurality of attributes; and means for specifying a total match value, wherein said total match value must be met or exceeded said one of said plurality of data objects to be determined to be associated with said object attribute record including said particular one of said first plurality of said plurality of attributes.

10. The system according to claim 9 further comprising:

means for each of said object attribute records, for establishing an object attribute record total match value;

means for each of said first plurality of said plurality of attributes for each of said object attribute records where said specified search data matched said associated data, for adding said match weight value to said object attribute record total match value.

11. The system according to claim 10, further comprising:

means for specifying a non-match weight value utilized when specified search data does not match data associated with a particular one of said first plurality of said plurality of attributes; and means for each of said first plurality of said plurality of attributes for each of said object attribute records where said specified search data does not match said associated data, for subtracting said non-match weight value from said object attribute record total match value.

12. The system according to claim 11, further comprising:

means for each of said object attribute records, for determining whether said object attribute record total match value meets or exceeds said total match value; and means responsive to said object attribute record total match value meeting or exceeding said total match value, for determining said data object associated with said object attribute record having an object attribute record total match value which meets or exceeds said total match value.

13. The system according to claim 9, further comprising:

means for specifying a plurality of valid combinations of said first plurality of said plurality of attributes; and means for determining whether said second plurality of said first plurality of said plurality of attributes is one of said plurality of valid combinations.

14. The system according to claim 13, wherein said means for searching each of said object attribute records for said specified search data is performed only in response to a determination that said second plurality of said first plurality of said plurality of attributes is one of said plurality of valid combinations.

15. The system according to claim 14, wherein said means for establishing a plurality of data objects having a plurality of attributes further includes means for establishing a plurality of data objects having a social security number as an attribute.

16. The system according to claim 15, wherein said means for establishing a plurality of data objects having a plurality of attributes further includes means for establishing a plurality of data objects having an individual's name as an attribute.

* * * * *